US010200654B2

(12) United States Patent
Szymczyk et al.

(10) Patent No.: US 10,200,654 B2
(45) Date of Patent: Feb. 5, 2019

(54) SYSTEMS AND METHODS FOR REAL TIME MANIPULATION AND INTERACTION WITH MULTIPLE DYNAMIC AND SYNCHRONIZED VIDEO STREAMS IN AN AUGMENTED OR MULTI-DIMENSIONAL SPACE (71) Applicants: Matthew Szymczyk, Manhattan Beach, CA (US); Alex Goldberg, Thousand Oaks, CA (US); Hans Forsman, Marina del Rey, CA (US); Jack Benoff, Hermosa Beach, CA (US); Aaron von Hungen, Culver City, CA (US); Blake Callens, Toluca Lake, CA (US); Mark Weisheit, Hermosa Beach, CA (US); Andrey Tkachuk, Stryi (UA)

(72) Inventors: Matthew Szymczyk, Manhattan Beach, CA (US); Alex Goldberg, Thousand Oaks, CA (US); Hans Forsman, Marina del Rey, CA (US); Jack Benoff, Hermosa Beach, CA (US); Aaron von Hungen, Culver City, CA (US); Blake Callens, Toluca Lake, CA (US); Mark Weisheit, Hermosa Beach, CA (US); Andrey Tkachuk, Stryi (UA)

(*) Notice: Subject to any disclaimer, the term of this patent is extended or adjusted under 35 U.S.C. 154(b) by 150 days.

(21) Appl. No.: 13/778,430

(22) Filed: Feb. 27, 2013

(65) Prior Publication Data
US 2014/0240444 A1 Aug. 28, 2014

(51) Int. Cl.
H04L 12/18 (2006.01)
H04N 7/15 (2006.01)

(52) U.S. Cl.
CPC ......... H04N 7/157 (2013.01); H04L 12/1827 (2013.01)

(58) Field of Classification Search
CPC .......................... H04L 12/1813; H04N 7/157
See application file for complete search history.

(56) References Cited

U.S. PATENT DOCUMENTS 6,219,045 B1 * 4/2001 Leahy et al. .................. 715/757
8,275,590 B2 9/2012 Szymczyk et al.
(Continued)

OTHER PUBLICATIONS

Nilsson, S., Gustafsson, T., & Carleberg, P. (2009). Hands Free Interaction with Virtual Information in a Real Environment: Eye Gaze as an Interaction Tool in an Augmented Reality System. PsychNology Journal, 7(2), 175-196.*
(Continued)

Primary Examiner — Duc Nguyen
Assistant Examiner — Kile O Blair
(74) Attorney, Agent, or Firm — Goodwin Procter LLP (57) ABSTRACT A new approach is proposed that contemplates systems and methods to allow real time manipulation of objects within multiple dynamic and augmented video streams/feeds synchronized in an augmented reality (AR) or multi-dimensional space. Under such an approach, a participant/user of a first AR system would be able to connect with participants/users of a second same, similar or different AR system and to share their initial and/or augmented video streams with those users to enhance the AR experience from one participant to many. Through real time synchronization of augmented video streams in the AR systems, the users of both the first and the second AR system can see, share, manipulate and interact with the augmented content/objects either in his/her own augmented video streams or in the augmented video streams of another user.

53 Claims, 3 Drawing Sheets (56) References Cited

U.S. PATENT DOCUMENTS

2011/0040539 A1     2/2011   Szymczyk et al.
2012/0313969 A1   12/2012   Szymczyk et al.
2012/0320158 A1* 12/2012   Junuzovic ............... G06F 3/017
                                                                         348/46

OTHER PUBLICATIONS

ZugSTAR—Streaming Augmented Reality, Zugara, YouTube Uploaded on Feb. 4, 2010, https://www.youtube.com/watch?v=eSFiCHkZgkA, selected frames attached spanning portion of the video from 1:11-1:25, not all frames in that period are shown, 20 pages.*
https://web.archive.org/web/20121026135728/http://weareorganizedchaos.com/index.php/2009/11/04/zugaras-zugstar-video-conferencing-augmented-reality-a-shared-ar-experience/.*
Zugara, (Feb. 4, 2010) "ZugSTAR—Streaming Augmented Reality", Retrieved from YouTube.com on Jul. 30, 2015 and available at https://www.youtube.com/watch?v=eSFiCHkZgkA, (2 pages).
"Zugara's ZugSTAR: Video Conferencing + Augmented Reality = A Shared AR Experience," We Are Organized Chaos, published Nov. 4, 2009 (4 pages).
"The Future of Augmented Reality Online," IAB Poland—Zugara Augmented Reality Presentation, published Nov. 6, 2009 (30 pages).
"Zugara's Augmented Reality & Motion Capture Shopping App," Zugara, Youtube video published on Jun. 23, 2009 (3 pages).
"Examples of Augmented Reality," Youtube video published on Nov. 2, 2009 (2 pages).

* cited by examiner

SYSTEMS AND METHODS FOR REAL TIME MANIPULATION AND INTERACTION WITH MULTIPLE DYNAMIC AND SYNCHRONIZED VIDEO STREAMS IN AN AUGMENTED OR MULTI-DIMENSIONAL SPACE

BACKGROUND

Augmented Reality (AR) is a live, direct or indirect, view of a physical, real-world environment whose elements and objects are augmented by computer-generated sensory input such as sound, video, graphics or GPS data. Under AR, a view of reality is modified (possibly augmented) by a computer to enhance a user's current perception of reality. Augmentation is conventionally done in real-time and in semantic context with environmental elements and objects, such as sports scores on TV during a match. By overlaying artificial information about the environment and its objects onto the real world, advanced AR technologies makes the information about the surrounding real world of the user becomes interactive and digitally manipulatable.

Current AR systems or simply augmented systems are restricted to only allow for one single user/subject to interact with the objects or video streams in the augmented object experience. As a result, a user of the AR system does not have a way to share his/her augmented object, video stream and/or experience with additional users on the same, similar or different AR system in real-time. In the non-limiting example of virtual shopping, when a user interacts with a virtual or augmented reality shopping application, the user can only see the object or video stream that he/she is interacting with. If the user is trying on virtual clothes or accessories in a virtual fitting room, for example, only he/she can view the effects from his/her own interface module or system. This creates a scenario where the user has to record video or take a photo of his/her AR experience in order to share such AR experience with others.

Additionally, current systems do not support simultaneously synchronizing an augmented video stream with the video streams from other users in communication. For a non-limiting example, current video chat systems such as Skype, allow two users to connect basic video streams to see and chat with one another. These video chat systems, however, do not allow synchronization of augmented objects in the shared video streams that can be interacted with by other users.

The foregoing examples of the related art and limitations related therewith are intended to be illustrative and not exclusive. Other limitations of the related art will become apparent upon a reading of the specification and a study of the drawings.

DETAILED DESCRIPTION OF EMBODIMENTS

The approach is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

A new approach is proposed that contemplates systems and methods to allow real time manipulation of objects within multiple dynamic and augmented video streams/feeds synchronized in an augmented reality (AR) or multi-dimensional space. Under such an approach, a participant/user of a first AR system would be able to connect with participants/users of a second same, similar or different AR system and to share their initial and/or augmented video streams with those users to enhance the AR experience from one participant to many. Through real time synchronization of augmented video streams in the AR systems, the users of both the first and the second AR system can see, share, manipulate, and interact with the augmented content/objects either in his/her own augmented video streams or in the augmented video streams of another user. Here, the initial and/or augmented video streams from the participants are synchronized in real time, not only in time but also in three-dimensional space/coordinates (X, Y, Z).

By not only connecting but also simultaneously synchronizing the augmented video streams among multiple users, the proposed approach provides an interactive augmented reality video chat or conference platform that enables multiple users to connect via video chat and to interact with virtual objects that the users are viewing in the synchronized augmented video streams. Furthermore, the proposed approach would improve the video chat experience by synchronizing and continually updating the augmented video streams and the augmented content/objects in the streams for all users in real time.

Compared to current systems that do not synchronize augmented objects in an augmented video stream or simultaneously synchronizing the augmented video stream with the initial video stream from the users, the proposed approach allows for the synchronization of the augmented video stream to allow the users to continually see and interact with augmented objects in the synchronized augmented video streams across multiple AR systems or platforms.

In the case of virtual shopping, the proposed approach would allow the initial/first user to connect his/her augmented video stream with other users so that all users could see what (virtual) clothes other people are trying on. These users would also be able to interact with augmented objects in their own augmented video streams or the augmented video stream of another user. As a non-limiting example, if a user is shopping on an e-commerce website, a sales associate could see the items the shopper is trying on and suggest other items to the user by applying these new items/objects to the online shopper's augmented video stream.

Figure 1:
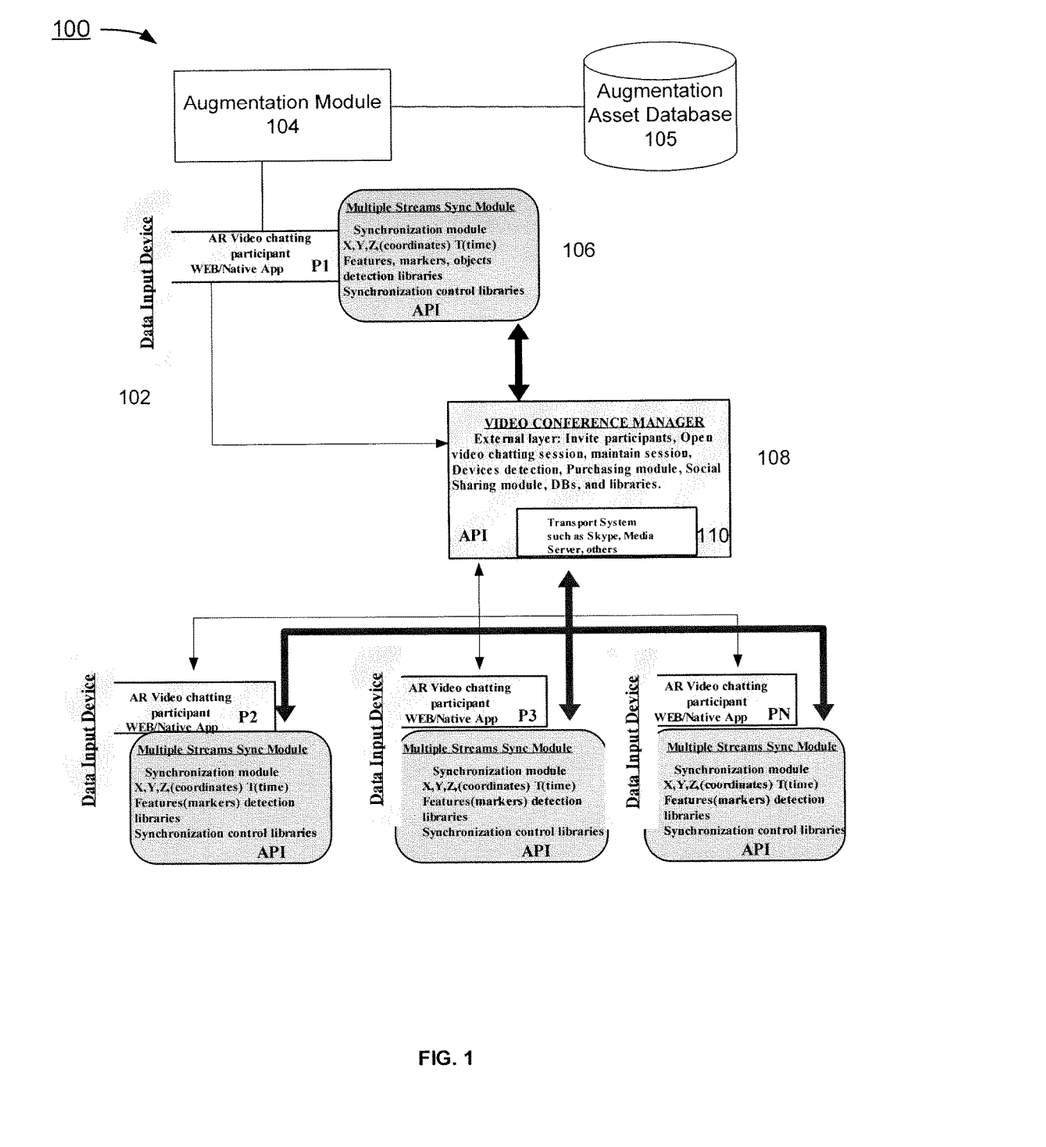
FIG. 1 depicts an example of a system diagram to support real time synchronization of multiple augmented video streams in an AR environment.

FIG. 1 depicts an example of a system diagram 100 to support real time synchronization of multiple augmented video streams in an AR environment. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1, the system 100 includes at least a data input device 102, an augmentation module 104, and a multiple streams sync module 106 associated with each of the multiple AR video chatting participants as well as a video conference manager 108, and a transport system 110. As used herein, the term device, module, manager or system each refers to software, firmware, processor, hardware, or other component that is used to effectuate a purpose. Each of the device, module, manager or system will typically include software instructions that are stored in non-volatile memory (also referred to as secondary memory). When the software instructions are executed, at least a subset of the software instructions is loaded into memory (also referred to as primary memory) by a processor. The processor then executes the software instructions in memory. The processor may be a shared processor, a dedicated processor, or a combination of shared or dedicated processors. A typical program will include calls to hardware components (such as I/O devices), which typically requires the execution of drivers. The drivers may or may not be considered part of the engine, but the distinction is not critical. In some embodiments, the device, module, manager or system could be chip or processor-based, removing the need for software instructions.

In the example of FIG. 1, each of the device, module, manager or system can run on one or more hosting devices (hosts). Here, a host can be a computing device, a communication device, a storage device, or any electronic device capable of running a software component and having internet or network connections. For non-limiting examples, a computing device can be but is not limited to a laptop PC, a desktop PC, a tablet PC, MAC, an iPod, an iPhone, an iPad, Google's Android device, Google's Glasses, PC powered eyewear, a PDA, or a server machine. A storage device can be but is not limited to a hard disk drive, a flash memory drive, or any portable storage device. A communication device can be but is not limited to a mobile phone.

In the example of FIG. 1, each of the device, module, manager or system has a communication interface (not shown), which is a software component that enables the engines to communicate with each other following certain communication protocols, such as TCP/IP protocol, over one or more communication networks (not shown). Here, the communication networks can be but are not limited to, internet, intranet, wide area network (WAN), local area network (LAN), wireless network, Bluetooth, WiFi, and mobile communication network. The physical connections of the network and the communication protocols are well known to those of skill in the art.

In the example of FIG. 1, each AR video chatting participant can be any person/user associated with any type of computing/hosting device, including but is not limited to one of those listed above that enables each AR video chatting participant to participate in a video chat or conference with other participants via either a Web based app or a native app running on the computing/hosting device. The computing/hosting device is also capable of supporting data input device 102 associated with each AR video chatting participant, wherein each data input device 102 can be but is not limited to one or more of imaging device, audio input device (e.g., microphone), camera, depth sensing device (e.g., depth sensing camera), sensor, laser-based equipment, wave emitter, receiver, other any other type of device capable of accepting audio, video, multimedia or text data input from the AR video chatting participant associated with the device.

In the example of FIG. 1, each augmentation module 104 synchronizes each AR video chatting participant's initial video stream originated by an application running on the hosting device of the participant via data input device 102 with augmented objects and/or streams requested by the participant to create an augmented video stream in real time. The augmentation module could either reside at each participant's location, or reside on a remote server. In some embodiments, augmentation module 104 generates the augmented video stream by synchronizing the augmented objects with the initial video stream based on relative (X, Y, Z) coordinates and time (T) of the objects. In some embodiments, augmentation module 104 may retrieve the augmented objects from augmented asset database 105. As used herein, augmented asset database 105 can be at the same location as the hosting device running augmentation module 104 or at a different location in the "cloud" that is accessible by all AR video chatting participants of the video chat or conference.

In some embodiments, augmentation module 104 may update coordinates for the positions of the retrieved augmented objects in real time according to changing tracking data and timing within each session of video chat or conference in order to reduce latency of the augmented video stream. Once the augmented video stream is generated, augmentation module 104 allow the participant to manipulate the augmented objects in the augmented video stream and to share the augmented video stream with other participants in the video chat/conference.

In the example of FIG. 1, each multiple streams sync module 106 associated with the participant synchronizes the augmented video stream of the participant with the initial or augmented video streams from other participants of the video chat or conference in both time (T) and in three-dimensional coordinates (X, Y, Z) to generate a synchronized augmented video stream. Specifically, when the participant of an AR system connects with another participant of the same, similar or different AR system during a video chat or conference session, multiple streams sync module 106 will determine the X,Y,Z, and T coordinates of the objects in the augmented video stream of the participant. As the connection occurs, multiple streams sync module 106 multiplexes the augmented video stream of the participant with the initial or augmented video stream from the other participant and allows real time extraction of the augmented object(s) from the multiplexed video stream, manipulates the extracted object(s), and synchronize them back into the synchronized augmented video stream according to new X,Y,Z,T coordinates dynamically modified in real time. Once synchronized, the X,Y,Z and T coordinates of the object in the 3D or multi-dimensional space of the synchronized augmented video streams are shared/displayed by the multiple streams sync module 106 to each of the participants, who will be able to see, interact with, and manipulate the objects according to the interaction and manipulation of the X,Y,Z and T coordinates of the objects in real time.

In some embodiments, multiple streams sync module 106 multiplexes the augmented objects and video streams from different participants into the new synchronized augmented video stream via active control on synchronization of HB (human behavior) of the participants in addition to X,Y,Z, and T coordinates. In some embodiments, multiple streams sync module 106 may synchronize the augmented video streams from the participants in such a way as to reduce latency of the synchronized augmented video streams shared among the participants. The multiple streams sync module 106 may also broadcast the multiplexed augmented video streams to all participants of the video chat or conference.

In some embodiments, multiple streams sync module 106 allows display and extraction of one or more virtual/augmented objects from the synchronized augmented video stream, which could then in turn be manipulated by the participants. Specifically, multiple streams sync module 106 accepts a combination of one or more hand gestures, motions, and touches of a participant through a video-based computer interface of data input device 102, wherein such hand gestures and motions are used to perform one or more of: creating or controlling the objects in the synchronized augmented video stream, selecting various commands from an object submenu, and drawing three dimensional curves, surfaces, and/or ribbons in the synchronized augmented video stream. Here, the various commands selected and executed using intuitive hand gestures and motions include but are not limited to creating a new virtual/augmented object, deleting, moving, changing, and resizing an existing virtual/augmented object in the synchronized augmented video stream. In some embodiments, multiple streams sync module 106 limits the controlling hand gestures of the participant to his/her first finger, second finger, and arm movements, and allows the control and manipulation of the virtual/augmented object only by a participant, not by another object in the synchronized augmented video stream.

In some embodiments, multiple streams sync module 106 may use one or more voice commands independently or in conjunction with the hand gestures and motions to interact with and control the virtual/augmented object within the augmented system and synchronized stream. In some embodiments, multiple streams sync module 106 may utilize pupil tracking to control and manipulate the virtual/augmented object via a participant's eyes.

In some embodiments, multiple streams sync module 106 works across multiple platforms or hosting devices so that an augmented video stream initiated by a participant from a smartphone platform can be synchronized and shared with another participant using a different platform such as a Web application, an Interactive Television application, an in-store Kiosk application etc.

In the example of FIG. 1, video conference manager 108 creates a chat room or conference session for the video chat or conference, invites multiple AR video chatting participants to join the video chat or conference, and maintains the conference session during the video chat or conference. Video conference manager 108 may also monitor, organize, and store information relevant to AR video chatting participants and/or the locations of the augmented assets (e.g., virtual or digital objects) used during the session. Additionally, video conference manager 108 may also perform device detection to select the proper video/audio protocol compatible with the hosting device of each of the participants.

In the example of FIG. 1, transport system 110 encodes and distributes the synchronized, augmented, and/or initial video streams among the multiple AR video chatting participants. The transport system 110 supports multiple audio/video communication platforms and encoding/decoding formats in order to simplify the process of delivering the augmented video streams. It is capable of streaming augmented video stream from one participant once and deliver it to the hosting devices (e.g., PCs, mobile devices, tablets, and IPTVs) associated with all other participants to the video chat or conference simultaneously with the augmented video stream encoded in proper format compatible with the corresponding hosting devices.

In some embodiments, the transport system 110 can utilize any existing audio/video conferencing platform (such as Skype or others) and/or applications over any type of networks (e.g., Internet, private networks, corporate networks, etc.) to support the distribution of the synchronized augmented video streams without any limitation on the number of participants in the video chat/conference, the number or type of augmented objects controlled or accessed by the participants to the video chat/conference, the locations of the augmented objects, or the types of initial or augmented video streams, which for non-limiting examples, can include holographic or any types of visual presentation streams.

Figure 2:
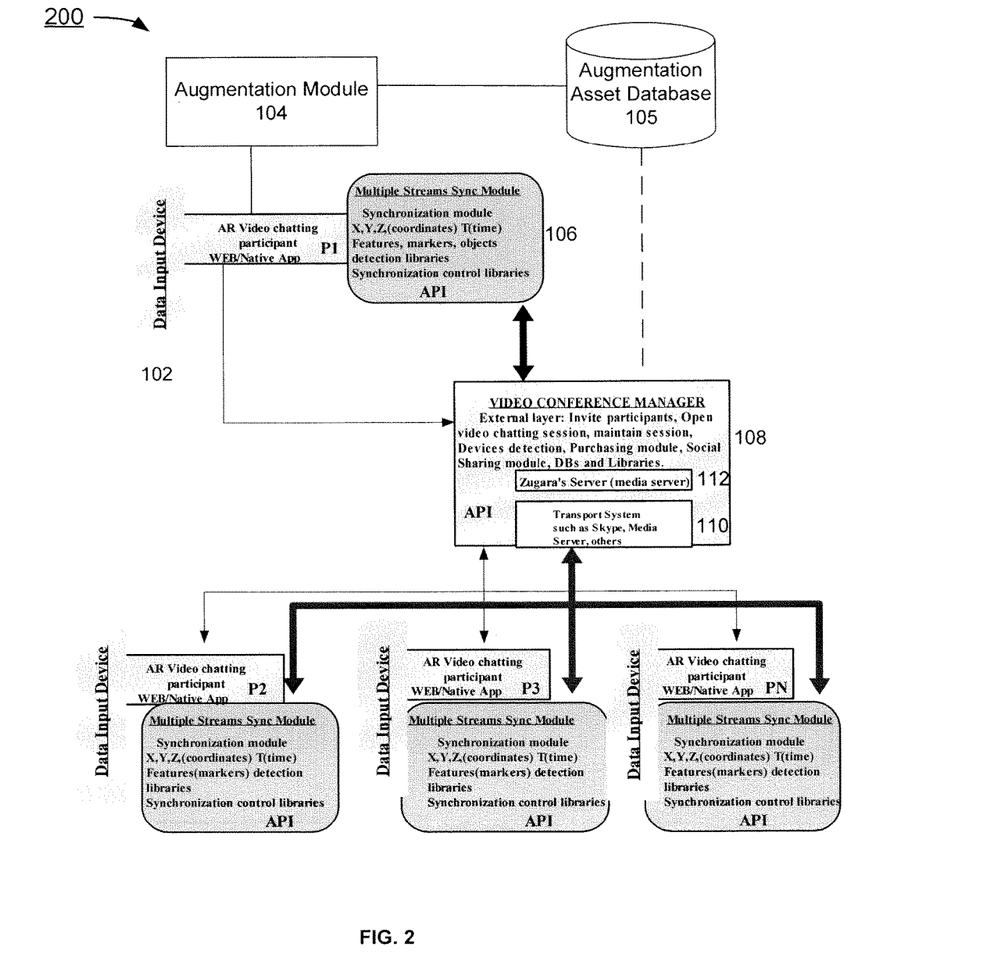
FIG. 2 depicts another example of a system diagram to support real time synchronization of multiple augmented video streams in an AR environment.

FIG. 2 depicts another example of a system diagram 200 to support real time synchronization of multiple augmented video streams in an AR environment, which in addition to the components depicted in FIG. 1, further includes media server 112. In the example of FIG. 2, media server 112 is a device working with video conference manager 108 and transport system 110 to distribute and store the initial, augmented, and/or synchronized video streams from the multiple AR video chatting participants. As used herein, media server 112 refers either to a dedicated computer appliance or to specialized application software, video conferencing (or just a video) on demand.

Figure 3:
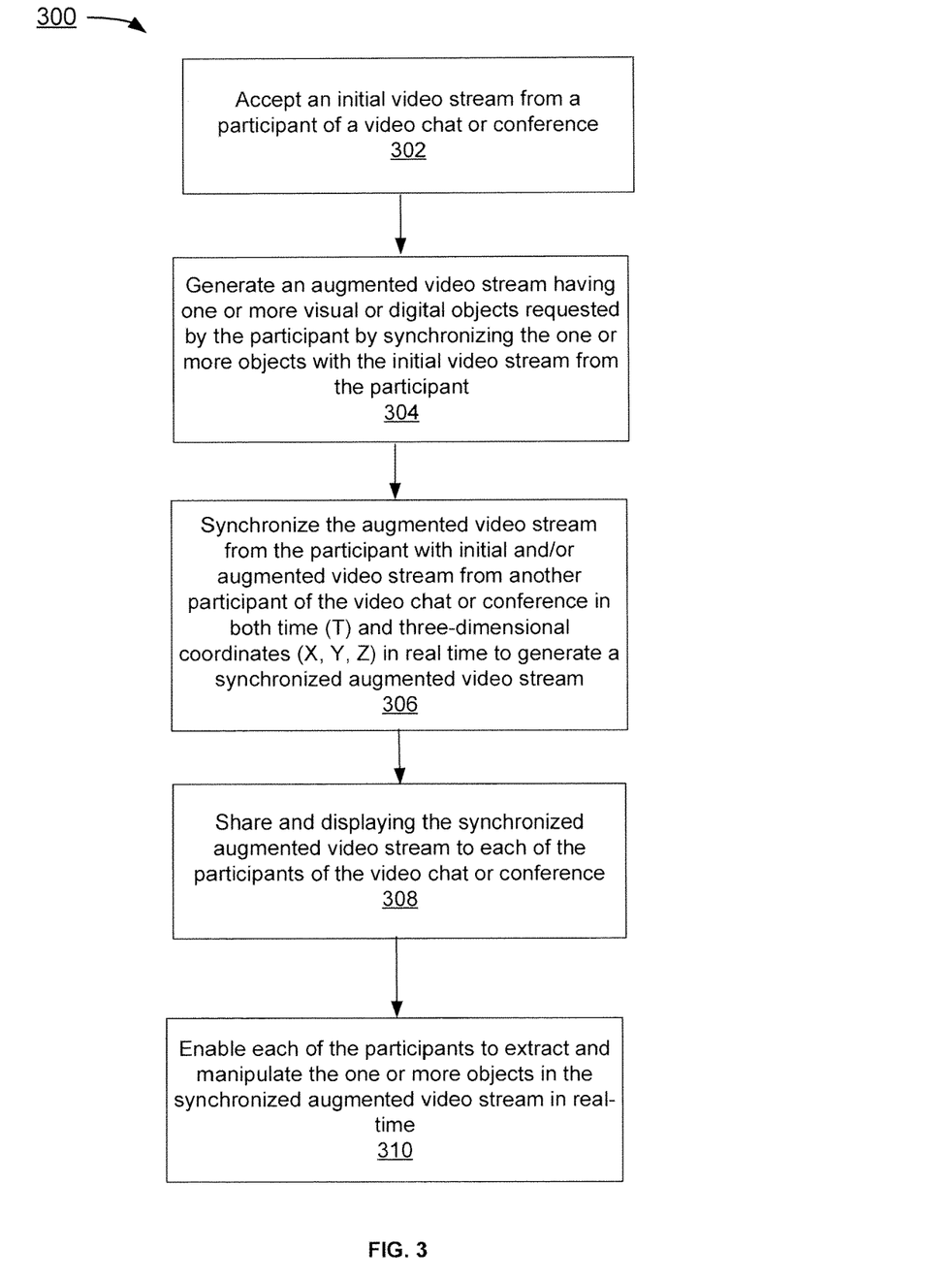
FIG. 3 depicts an example of a flowchart of a process to support real time synchronization of multiple augmented video streams in an AR environment.

FIG. 3 depicts an example of a flowchart 300 of a process to support real time synchronization of multiple augmented video streams in an AR environment. Although this figure depicts functional steps in a particular order for purposes of illustration, the process is not limited to any particular order or arrangement of steps. One skilled in the relevant art will appreciate that the various steps portrayed in this figure could be omitted, rearranged, combined and/or adapted in various ways.

In the example of FIG. 3, the flowchart 300 starts at block 302 where an initial video stream from a participant of a video chat or conference is accepted. The flowchart 300 continues to block 304 where an augmented video stream having one or more visual or digital objects requested by the participant is generated by synchronizing the one or more objects with the initial video stream from the participant. The flowchart 300 continues to block 306 where the augmented video stream from the participant is synchronized with initial and/or augmented video streams from other participants of the video chat or conference in both time (T) and three-dimensional coordinates (X, Y, Z) in real time to generate a synchronized augmented video stream. The flowchart 300 continues to block 308 where the synchronized augmented video stream is shared with and displayed to each of the participants. The flowchart 300 ends at block 310 where each of the participants is enabled to interact with and manipulate the one or more objects in the synchronized augmented video stream in real-time.

Use Cases

The systems and methods for real time synchronization of multiple augmented video streams discussed above have many potential applications and any industry that utilizes 2D or 3D models (e.g., holographic or displayed based video/imagery models) could benefit from our system. Since the augmented video stream from one participant is simultaneously synchronized with the video streams from other users and subsequently shared with them, any object that resides in the multi-dimensional space (3D for example) of the synchronized video stream could be interacted with and manipulated in real-time.

For the non-limiting example of a virtual fitting or dressing room, a user would be able to share items he/she is virtually trying on with other users in real-time. In addition, due to synchronization of the augmented video streams among multiple participants, each of the users/participants would be able to manipulate the objects in the synchronized, augmented video stream to recommend other virtual garments or matching garments to other participants by manipulating the corresponding augmented object in the augmented video stream.

In another non-limiting example, the systems and methods for real time synchronization of multiple augmented video streams discussed above can enable two persons to play an interactive game together. If the first person is in a hotel on business and the second person is at home, the first person could start up the system to initiate the game. As the augmented object is displayed and synchronized simultaneously into both persons' video streams/feeds, the first person could then move the positioning of the object (e.g., a toy house). Since both of their video streams have been synchronized with the augmented content (object), both persons would see the coordinates of the augmented object changing on their respective displays and either of them could manipulate the coordinates of the augmented object.

In another non-limiting example, the systems and methods for real time synchronization of multiple augmented video streams discussed above can enable a doctor to perform a remote diagnosis with a patient. The patient could contact the doctor through the augmented system and simultaneously, synchronize their augmented video streams. The doctor could then review an MRI with the patient and interact with the augmented object in the augmented video streams. Both the doctor and patient would be able to view the augmented object as its coordinates are adjusted and displayed in real-time.

In another non-limiting example, the systems and methods for real time synchronization of multiple augmented video streams discussed above can enable a teacher to give an interactive presentation to his/her students remotely. As the teacher and student interface with the AR system, the teacher's augmented video stream is simultaneously synchronized with the students' augmented video streams. The teacher could then interact with an object, e.g., a 3D DNA model, and as the teacher instructs on the DNA model, the students could in their own augmented video streams manipulate the coordinates of the DNA model thereby creating real-time interaction with the teacher's augmented object in the synchronized augmented video streams.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a machine readable medium (media) having instructions stored thereon/in which can be used to program one or more hosts to perform any of the features presented herein. The machine readable medium can include, but is not limited to, one or more types of disks including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Stored on any one of the computer readable medium (media), the present invention includes software for controlling both the hardware of the general purpose/specialized computer or microprocessor, and for enabling the computer or microprocessor to interact with a human viewer or other mechanism utilizing the results of the present invention. Such software may include, but is not limited to, device drivers, operating systems, execution environments/containers, and applications.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Particularly, while the concept "component" is used in the embodiments of the systems and methods described above, it will be evident that such concept can be interchangeably used with equivalent concepts such as, class, method, type, interface, module, object model, and other suitable concepts. Embodiments were chosen and described in order to best describe the principles of the invention and its practical application, thereby enabling others skilled in the relevant art to understand the claimed subject matter, the various embodiments and with various modifications that are suited to the particular use contemplated.

The invention claimed is:

1. A system, comprising:
a data input device comprising a video camera, which in operation, provides a real-world video stream comprising video of a real-world 3D environment including a participant in a video chat or conference; and
a multiple stream sync module, which in operation:
receives, from another participant in the video chat or conference, an augmented video stream comprising augmentation data representing one or more 3D virtual objects retrieved from a virtual object database, and
multiplexes the augmented video stream received from the other participant with the real-world video stream of the real-world 3D environment in real time to generate a multiplexed video stream comprising the video of the real-world 3D environment and the one or more 3D virtual objects represented by the augmentation data received from the other participant,
extracts at least one of the 3D virtual objects from the multiplexed video stream,
based on an action of the participant, translates coordinates of the extracted virtual object in at least three dimensions within a multi-dimensional space of the multiplexed video stream, wherein the three dimensions of the multi-dimensional space are defined by the video of the real-world 3D environment, and
causes a display device associated with the participant to display the multiplexed video stream comprising the video of the real-world 3D environment and the one or more 3D virtual objects, wherein both the participant and the other participant can translate the coordinates of the one or more 3D virtual objects within the three dimensions of the multi-dimensional space.

2. The system of claim 1, wherein: the participants of the video chat or conference are associated with one Augmented Reality (AR) system.

3. The system of claim 1, wherein: the participants of the video chat or conference are associated with different Augmented Reality (AR) systems.

4. The system of claim 1, wherein the data input device further comprises an audio device, a depth sensing camera, a laser-based equipment, a wave emitter and/or transmitter.

5. The system of claim 1, further comprising an augmentation module, wherein the augmented video stream, the augmentation data, and the one or more virtual objects comprise, respectively, a first augmented video stream, first augmentation data, and one or more first virtual objects, and wherein the augmentation module, in operation, generates a second augmented video stream comprising second augmentation data representing one or more second virtual objects.

6. The system of claim 5, wherein generating the second augmented video stream comprises synchronizing the second augmentation data representing the one or more second virtual objects with the real-world video stream in real time.

7. The system of claim 5, wherein: the augmentation module resides either at a location of the participant or on a remote server.

8. The system of claim 5, wherein the virtual object database is accessible to all participants in the video chat or conference.

9. The system of claim 6, wherein the real-world video stream comprises a first real-world video stream, wherein the multiplexed video stream comprises a first multiplexed video stream, and wherein the multiple stream sync module, in further operation:
  receives, from the other participant, a second real-world video stream comprising video of a real-world environment including the other participant;
  multiplexes the second augmented video stream generated by the augmentation module with the second real-world video stream received from the other participant in real time to generate a second multiplexed video stream comprising the second real-world video stream of the other participant and the one or more second virtual objects represented by the second augmentation data generated by the augmentation module; and
  sends the second multiplexed video stream to the other participant.

10. The system of claim 6, wherein: the augmentation module generates the second augmented video stream by synchronizing the one or more second virtual objects with the real-world video stream based on relative (X, Y, Z) coordinates and time (T) of the one or more second virtual objects.

11. The system of claim 6, wherein: the augmentation module updates coordinates of the one or more second virtual objects in real time according to changing tracking data and timing within each session of video chat or conference to reduce latency of the second augmented video stream.

12. The system of claim 1, wherein the multiple stream sync module, in further operation, synchronizes the augmented video stream with the real-world video stream in both time (T) and three-dimensional coordinates (X, Y, Z).

13. The system of claim 1, wherein the real-world video stream comprises a first real-world video stream, and wherein the augmented video stream is synchronized with a second real-world video stream comprising video of a real-world environment including the other participant.

14. The system of claim 1, wherein: the multiple stream sync module, in operation, multiplexes video streams from two or more participants into a multiplexed video stream via active control on synchronization of HB (human behavior) of the two or more participants in addition to X, Y, Z, and T coordinates.

15. The system of claim 1, wherein: the multiple stream sync module synchronizes augmented video streams from two or more participants in such a way as to reduce latency of multiplexed video streams shared among the two or more participants.

16. The system of claim 1, wherein: the multiple stream sync module broadcasts the multiplexed video stream to all participants in the video chat or conference.

17. The system of claim 1, wherein: the multiple stream sync module accepts one or more inputs selected from the group consisting of hand gestures, motions, and touches of the participant through a video-based computer interface of the data input device, and wherein the one or more inputs are used to perform one or more acts selected from the group consisting of: creating or controlling the one or more virtual objects in the multiplexed video stream, selecting various commands from an object submenu, and drawing three dimensional curves, surfaces, and/or ribbons in the multiplexed video stream.

18. The system of claim 17, wherein: the various commands selected and executed using the hand gestures and motions include one of creating a new object, deleting, moving, changing, and resizing an existing object in the multiplexed video stream.

19. The system of claim 17, wherein: the multiple stream sync module limits the controlling hand gestures of the participant to his/her first finger, second finger, and arm movements.

20. The system of claim 1, wherein: the multiple stream sync module interacts with and controls the one or more virtual objects within the multiplexed video stream in response to voice commands.

21. The system of claim 1, wherein: the multiple stream sync module controls and manipulates the one or more virtual objects within the multiplexed video stream by using pupil tracking to track movement of the participant's eyes.

22. The system of claim 1, wherein: the multiple stream sync module works across multiple platforms so that the augmented video stream provided by the other participant from one platform is synchronized and shared with the participant using a different platform.

23. The system of claim 1, further comprising: a video conference manager, which in operation, creates a chat room or conference session for the video chat or conference, invites the participants to join the video chat or conference, and maintains the session during the video chat or conference.

24. The system of claim 23, wherein: the video conference manager monitors, organizes, and stores information relevant to the participants and/or the locations of the one or more virtual objects used during the session.

25. The system of claim 23, wherein: the video conference manager performs device detection to select video/audio protocols compatible with respective hosting devices of each of the participants.

26. The system of claim 1, further comprising: a transport system, which in operation, encodes and distributes the video streams among the participants.

27. The system of claim 26, wherein: the transport system supports the distribution of the video streams without any limitation on one or more of: the number of the participants in the video chat/conference, the number or type of objects controlled or accessed by the participants, the locations of the objects, and the types of real-world or augmented video streams.

28. The system of claim 1, further comprising: a media server, which in operation, distributes and stores the real-world, augmented, and/or multiplexed video streams from the participants.

29. The system of claim 1, wherein multiplexing the augmented video stream with the real-world video stream comprises overlaying the one or more virtual objects onto the video of the real-world environment.

30. The system of claim 1, wherein multiplexing the augmented video stream with the real-world video stream comprises inserting the one or more virtual objects into the video of the real-world environment.

31. The system of claim 1, wherein the one or more 3D virtual objects are simultaneously present in the multiplexed video stream and not visible to image sensors of the video camera.

32. A method, comprising:
providing, using a video camera, a real-world video stream comprising video of a real-world 3D environment including a participant in a video chat or conference;
receiving, from another participant in the video chat or conference, an augmented video stream comprising augmentation data representing one or more 3D virtual objects retrieved from a virtual object database;
multiplexing the augmented video stream received from the other participant with the real-world video stream of the real-world 3D environment in real time to generate a multiplexed video stream comprising the video of the real-world 3D environment and the one or more 3D virtual objects represented by the augmentation data received from the other participant;
extracting at least one of the 3D virtual objects from the multiplexed video stream,
based on an action of the participant, translating coordinates of the extracted virtual object in at least three dimensions within a multi-dimensional space of the multiplexed video stream, wherein the three dimensions of the multi-dimensional space are defined by the video of the real-world 3D environment; and
causing a display device associated with the participant to display the multiplexed video stream comprising the video of the real-world 3D environment and the one or more 3D virtual objects, wherein both the participant and the other participant can translate the coordinates of the one or more 3D virtual objects within the three dimensions of the multi-dimensional space.

33. The method of claim 32, wherein multiplexing the augmented video stream with the real-world video stream comprises synchronizing the augmented video stream with the real-world video stream in both time (T) and three-dimensional coordinates (X, Y, Z).

34. The method of claim 32, wherein the real-world video stream comprises a first real-world video stream, and wherein the augmented video stream is synchronized with a second real-world video stream comprising video of a real-world environment including the other participant.

35. The method of claim 32, wherein multiplexing the augmented video stream with the real-world video stream comprises overlaying the one or more virtual objects onto the video of the real-world environment.

36. The method of claim 32, wherein multiplexing the augmented video stream with the real-world video stream comprises inserting the one or more virtual objects into the video of the real-world environment.

37. The method of claim 32, wherein the augmented video stream, the augmentation data, and the one or more virtual objects comprise, respectively, a first augmented video stream, first augmentation data, and one or more first virtual objects, and wherein the method further comprises generating a second augmented video stream comprising second augmentation data representing one or more second virtual objects.

38. The method of claim 37, wherein generating the second augmented video stream comprises synchronizing the second augmentation data representing the one or more second virtual objects with the real-world video stream in real time.

39. The method of claim 38, wherein the second augmentation data representing the one or more second virtual objects are synchronized with the real-world video stream based on relative (X, Y, Z) coordinates and time (T) of the one or more second virtual objects.

40. The method of claim 38, further comprising: updating coordinates of the one or more second virtual objects in real time according to changing tracking data and timing within each session of video chat or conference to reduce latency of the second augmented video stream.

41. The method of claim 38, wherein the real-world video stream comprises a first real-world video stream, wherein the multiplexed video stream comprises a first multiplexed video stream, and wherein the method further comprises:
receiving, from the other participant, a second real-world video stream comprising video of a real-world environment including the other participant;
multiplexing the second augmented video stream generated by the augmentation module with the second real-world video stream received from the other participant in real time to generate a second multiplexed video stream comprising the second real-world video stream of the other participant and the one or more second virtual objects represented by the second augmentation data generated by the augmentation module; and
sending the second multiplexed video stream to the other participant.

42. The method of claim 37, wherein the virtual object database is accessible to all participants in the video chat or conference.

43. The method of claim 32, wherein the multiplexing of the augmented video stream and the real-world video stream to generate the multiplexed video stream is performed based on active control on synchronization of HB (human behavior) of the participants in addition to X, Y, Z, and T coordinates.

44. The method of claim 32, wherein the multiplexing of the augmented video stream and the real-world video stream to generate the multiplexed video stream comprises synchronizing the augmented and real-world video streams in such a way as to reduce latency of the multiplexed video stream.

45. The method of claim 32, further comprising: broadcasting the multiplexed video stream to all participants in the video chat or conference.

46. The method of claim 32, further comprising:
accepting one or more inputs selected from the group consisting of hand gestures, motions, and touches of the participant through a video-based computer interface; and using the one or more inputs to perform one or more acts selected from the group consisting of: creating or controlling the one or more virtual objects in the multiplexed video stream, selecting various commands from an object submenu, and drawing three dimensional curves, surfaces, and/or ribbons in the multiplexed video stream.

47. The method of claim 46, further comprising: limiting the controlling hand gestures of the participant to his/her first finger, second finger, and arm movements.

48. The method of claim 32, further comprising: controlling and manipulating the one or more virtual objects within the multiplexed video stream by using pupil tracking to track movement of the participant's eyes.

49. The method of claim 32, further comprising: synchronizing the augmented and real-world video streams across multiple platforms so that the augmented video stream provided by the other participant from one platform is shared with the participant using a different platform.

50. The method of claim 32, further comprising: creating a chat room or conference session for the video chat or conference, inviting the participants to join the video chat or conference, and maintaining the session during the video chat or conference.

51. The method of claim 50, further comprising: monitoring, organizing, and storing information relevant to the participants and/or the locations of the one or more virtual objects used during the session.

52. The method of claim 32, further comprising: performing device detection to select video/audio protocols compatible with respective hosting devices of each of the participants.

53. The method of claim 32, further comprising: encoding and distributing the video streams among the participants without any limitation on one or more of: the number of the participants in the video chat/conference, the number or type of objects controlled or accessed by the participants, the locations of the objects, and the types of real-world or augmented video streams.

* * * * *